(12) United States Patent
Kasahara

(10) Patent No.: US 8,572,995 B2
(45) Date of Patent: Nov. 5, 2013

(54) REFRIGERATION SYSTEM

(75) Inventor: Shinichi Kasahara, Osaka (JP)

(73) Assignee: Daikin Industries, Ltd., Osaka-shi (JP)

( * ) Notice: Subject to any disclaimer, the term of this patent is extended or adjusted under 35 U.S.C. 154(b) by 653 days.

(21) Appl. No.: 12/935,355

(22) PCT Filed: Mar. 30, 2009

(86) PCT No.: PCT/JP2009/001441
§ 371 (c)(1),
(2), (4) Date: Sep. 29, 2010

(87) PCT Pub. No.: WO2009/122706
PCT Pub. Date: Oct. 8, 2009

(65) Prior Publication Data
US 2011/0023534 A1    Feb. 3, 2011

(30) Foreign Application Priority Data

Mar. 31, 2008   (JP) .................................. 2008-092445

(51) Int. Cl.
*F25B 5/00* (2006.01)
*F25B 49/00* (2006.01)
(52) U.S. Cl.
USPC ................................ 62/200; 62/225; 62/227

(58) Field of Classification Search
USPC ......... 62/199, 200, 204, 225, 226, 227, 228.1
See application file for complete search history.

(56) References Cited

U.S. PATENT DOCUMENTS

| | | | |
|---|---|---|---|
| 5,237,833 A * | 8/1993 | Hayashida et al. | 62/324.6 |
| 5,388,422 A * | 2/1995 | Hayashida et al. | 62/211 |
| 2002/0026803 A1 | 3/2002 | Inoue et al. | |
| 2011/0197607 A1* | 8/2011 | Tanaka et al. | 62/180 |
| 2013/0167571 A1* | 7/2013 | Nakagawa | 62/176.4 |

FOREIGN PATENT DOCUMENTS

| | | |
|---|---|---|
| JP | 2000-39220 A | 2/2000 |
| JP | 2000-46401 A | 2/2000 |
| JP | 2005-30679 A | 2/2005 |
| JP | 2007-240128 A | 9/2007 |

* cited by examiner

*Primary Examiner* — Marc Norman
(74) *Attorney, Agent, or Firm* — Birch, Stewart, Kolasch & Birch, LLP

(57) ABSTRACT

An air conditioner (10) includes a refrigerant circuit (20) including a plurality of indoor heat exchangers (27). A controller (1) for controlling operation of the air conditioner (10) includes a change unit (5) configured to change a set temperature Tem to a value larger than a current value when the minimum target superheat degree SHsm of target superheat degrees SHs determined for the respective indoor heat exchangers (27) is higher than a predetermined value SHt.

4 Claims, 3 Drawing Sheets

REFRIGERATION SYSTEM

TECHNICAL FIELD

The present disclosure relates to refrigeration systems including refrigerant circuits performing refrigeration cycles, and more particularly to techniques for controlling operation of a refrigeration system including a refrigerant circuit in which a plurality of evaporators are connected to each other.

BACKGROUND ART

Conventional refrigeration systems including refrigerant circuits performing refrigeration cycles by circulating refrigerants are known. Examples of such refrigeration systems include a so-called multi-type refrigeration system in which a plurality of indoor units are connected in parallel to one outdoor unit (see, for example, Patent Document 1).

In this refrigeration system, the outdoor unit includes an outdoor circuit, and the indoor units include indoor circuits. The outdoor circuit includes a compressor, an outdoor heat exchanger, an outdoor expansion valve, and a receiver, for example. Each of the indoor circuits includes an indoor heat exchanger and an indoor expansion valve. A refrigerant circuit of the refrigeration system is configured by connecting the indoor circuits in parallel to the outdoor circuit.

Example of methods for adjusting the amount of heat exchange in the indoor units of the refrigeration system include a method of performing capacity control of the compressor and refrigerant outlet superheat degree control with the indoor expansion valves. The capacity control of the compressor is performed based on a pressure detected by a refrigerant-pressure sensor provided at the suction side of the compressor. Specifically, the operating frequency of the compressor is adjusted such that a saturation temperature (i.e., an evaporation temperature) corresponding to the pressure calculated from the detected pressure approaches a predetermined evaporation temperature (hereinafter referred to as a set temperature).

With this configuration, when the current evaporation temperature is lower than the set temperature in the capacity control of the compressor, the operating frequency of the compressor is reduced to reduce the capacity of the compressor. Then, power consumption of the compressor decreases, and the evaporation temperature increases, resulting in that the evaporation temperature approaches the set temperature. On the other hand, when the current evaporation temperature is higher than the set temperature, the operating frequency of the compressor is increased to increase the capacity of the compressor. Then, power consumption of the compressor increases, and the evaporation temperature decreases, resulting in that the evaporation temperature approaches the set temperature.

The refrigerant outlet superheat degree control is performed based on a temperature detected by a refrigerant outlet temperature sensor provided at the outlet of each of the indoor heat exchangers and a pressure detected by the refrigerant-pressure sensor. Specifically, the opening degree of each of the indoor expansion valves of the indoor heat exchangers is adjusted such that the refrigerant outlet superheat degree for each of the indoor units calculated from the detected temperature and the detected pressure reaches a target superheat degree determined according to the amount of heat exchange necessary for the indoor heat exchanger of the indoor unit. In this operation, the amount of heat exchange necessary for the indoor heat exchanger is determined based on a deviation between an indoor set temperature and an indoor temperature of a room in which the indoor heat exchanger is located.

With this configuration, when the indoor temperature is higher than the indoor set temperature in the refrigerant outlet superheat degree control, the target superheat degree is set at a degree lower than the current degree. Then, a deviation occurs between the current refrigerant outlet superheat degree and the target superheat degree, and the opening degree of the indoor expansion valve increase so as to increase the deviation. On the other hand, when the indoor temperature is lower than the indoor set temperature, the target superheat degree is set at a degree higher than the current degree. Then, a deviation occurs between the current refrigerant outlet superheat degree and the target superheat degree, and the opening degree of the indoor expansion valve decrease so as to reduce the deviation. In this manner, the opening degrees of the indoor expansion valves are adjusted to adjust the flow rate of refrigerants flowing in the indoor heat exchangers, thereby increasing or decreasing the amount of heat exchange in the indoor heat exchangers so that the indoor temperature approaches the indoor set temperature of the room.

CITATION LIST

Patent Document

PATENT DOCUMENT 1: Japanese Patent Publication No. 2000-046401

SUMMARY OF THE INVENTION

Technical Problem

However, in a conventional multi-type refrigeration system, when the capacity control of the compressor and the refrigerant outlet superheat degree control as described above are performed, the amount of heat exchange in each of the indoor units can be adjusted such that the indoor temperature of the indoor unit approaches the indoor set temperature, but the set temperature is not determined in consideration of power consumption of the compressor necessary for obtaining the amount of heat exchange. Accordingly, in some operating conditions of the refrigeration system, power consumption of the compressor necessary for obtaining an intended amount of heat exchange disadvantageously increases.

It is therefore an object of the present invention to provide a refrigeration system which includes a refrigerant circuit including a plurality of evaporators and in which power consumption of a compressor for obtaining the amount of heat exchange necessary for the evaporators can be reduced as much as possible so as to reduce a decrease in the coefficient of performance (COP) of the refrigeration system.

Solution to the Problem

A first aspect of the present invention is directed to a refrigeration system including: a refrigerant circuit (20) configured to perform a refrigeration cycle and including a compressor (21) having a variable capacity, a plurality of evaporators (27), and expansion mechanisms (26) respectively associated with the evaporators (27); a capacity adjustment unit (6) configured to adjust the capacity of the compressor (21) such that an evaporation temperature Te of a refrigerant circulating in the refrigerant circuit (20) approaches a predetermined set temperature Tem; and a pressure-reduction-amount adjustment unit (9) configured to adjust an amount of pressure reduction of a refrigerant passing through each of the expansion mechanisms (26) such that a refrigerant outlet superheat degree SH of an associated one of the evaporators (27) approaches a target superheat degree SHs determined based on an amount of heat exchange necessary for the evaporator (27).

In the first aspect, the refrigeration system includes the change unit (5) configured to change the set temperature Tem to a value larger than a current value when a lowest one (hereinafter referred to as a minimum target superheat degree SHsm) of target superheat degrees SHs determined for the respective evaporators (27) is higher than a predetermined value SHt.

In the first aspect, when the minimum target superheat degree SHsm is higher than the predetermined value SHt, the set temperature Tem can be changed to a value larger than the current value. In other words, the set temperature Tem is gradually changed to larger values from the current value, i.e., is gradually increased from the current value, and when the minimum target superheat degree SHsm reaches the predetermined value SHt or less, the change of the set temperature Tem is stopped.

When the set temperature Tem is changed to a value larger than the current value, the capacity adjustment unit (6) reduces the capacity of the compressor (21) such that the current evaporation temperature Te approaches the set temperature Tem. Thus, power consumption of the compressor (21) can be reduced to be smaller than that before the change in the set temperature Tem.

On the other hand, when the capacity of the compressor (21) decreases, the flow rate of a refrigerant flowing in each of the evaporators (27) decreases, and the amount of heat exchange in the evaporators (27) decreases. To compensate for the reduced amount of heat exchange, the pressure-reduction-amount adjustment unit (9) sets the target superheat degree SHs at a degree lower than the current degree, and reduces the amount of pressure reduction of a refrigerant passing through the expansion mechanisms (26) such that the current refrigerant outlet superheat degree SH approaches the set target superheat degree SHs. Consequently, the flow rate of a refrigerant flowing in the evaporators (27) increases, and thus, it is possible to prevent the amount of heat exchange in the evaporators (27) from decreasing to be smaller than the change in the set temperature Tem.

The set temperature Tem is changed to a value larger than the current value in the operating condition in which the minimum target superheat degree SHsm is higher than the predetermined value SHt, in order to prevent the compressor (21) from performing wet operation. This is because when the evaporation temperature Te increases to approach the set temperature Tem after a change in the set temperature Tem, a refrigerant flowing out of the evaporator (27) having the minimum target superheat degree SHsm tends to be changed from a superheated state into a dual-phase state due to an increase in the evaporation pressure of the refrigerant.

The predetermined value SHt is the lower limit of the minimum target superheat degree SHsm in the case where the change in the set temperature Tem is permitted. Thus, the predetermined value SHt is preferably a value at which the compressor (21) does not perform wet operation after the change in the set temperature Tem. Alternatively, based on the relationship between the refrigerant outlet superheat degree SH and the COP as shown in FIG. 3, the predetermined value SHt may be set to obtain an intended COP.

In a second aspect of the present invention, in the refrigeration system of the first aspect, the change unit (5) includes a determination part (5a) configured to determine an amount of change in the set temperature Tem based on a deviation between the lowest one of the target superheat degrees SHs determined for the respective evaporators (27) and the predetermined value SHt, and the change unit (5) is configured to change the set temperature Tem to a value larger than a current value by the amount of change determined by the determination part (5a).

In the second aspect, the amount of change in changing the set temperature Tem to a value larger than the current value is determined based on a deviation between the minimum target superheat degree SHsm and the predetermined value SHt. That is, as the evaporation temperature Te increases, the superheat region of the heat transfer area in the evaporators (27) tends to be smaller, and the refrigerant outlet superheat degrees SH of the evaporators (27) tend to decrease. Accordingly, for example, as the deviation increases, the amount of change in the set temperature Tem can be increased, and power consumption of the compressor (21) can be appropriately reduced according to the operating state of the refrigeration system.

In a third aspect of the present invention, in the refrigeration system of the second aspect, the change unit (5) includes a correction part (5b) configured to correct the amount of change determined by the determination part (5a) to a larger value when one of the evaporators (27) having a relatively large capacity has the lowest target superheat degree SHs, and to a smaller value when one of the evaporators (27) having a relatively small capacity has the lowest target superheat degree SHs.

In the third aspect, the amount of change determined by the determination part (5a) can be corrected based on the capacity of the evaporator (27) having the minimum target superheat degree SHsm. The amount of correction increases as the capacity of the evaporator (27) increases. This setting of the amount of correction is determined because when the evaporation temperatures Te of the evaporators (27) are increased in the same manner, the superheat region of the heat transfer area in the evaporator (27) having a larger capacity is less narrowed, and the refrigerant outlet superheat degree SH of this evaporator (27) is less reduced.

In a fourth aspect of the present invention, in the refrigeration system of one of the first to third aspects, the refrigerant circulating in the refrigerant circuit (20) is carbon dioxide.

In the fourth aspect, even in the refrigeration system including the refrigerant circuit (20) in which carbon dioxide is enclosed, the presence of the change unit (5) can reduce power consumption of the compressor (21) as compared to power consumption thereof before a change in the set temperature Tem, while preventing the amount of heat exchange in each of the evaporators (27) from decreasing from the amount before the change in the set temperature Tem. As shown in FIG. 3, in the case of using carbon dioxide, the degree of a decrease in the COP with an increase in the superheat degree is higher than that in the case of using a fluorocarbon refrigerant, the predetermined value SHt is preferably smaller than that in the case of using the fluorocarbon refrigerant.

Advantages of the Invention

Unlike conventional refrigeration systems, according to the present invention, the set temperature Tem can be changed to a value larger than a current value based on the target superheat degrees SHs of the evaporators (27). Approaching of the evaporation temperature Te to the thus changed set temperature Tem can reduce power consumption of the compressor (21) as compared to power consumption before the change in the set temperature Tem, while preventing the amount of heat exchange in each of the evaporators (27) from decreasing from the amount before the change in the set temperature Tem. Accordingly, in the refrigeration system including the refrigerant circuit (20) with a plurality of evaporators (27), power consumption of the compressor (21) necessary for obtaining the amount of heat exchange in the evaporators (27) can be reduced as much as possible to reduce a decrease in the coefficient of performance (COP) of the refrigeration system.

The change in the set temperature Tem to a value larger than the current value increases the evaporation temperature Te and reduces the refrigerant outlet superheat degrees SH of the evaporators (27). As shown in FIG. 3, as the refrigerant outlet superheat degree SH decreases, the COP tends to increase. Thus, a decrease in the refrigerant outlet superheat degrees SH of the evaporators (27) can reduce power consumption of the compressor (21) as much as possible to reduce a decrease in the coefficient of performance (COP) of the refrigeration system.

In the second aspect, the amount of change in changing the set temperature Tem to a value larger than the current value can be determined based on a deviation between the minimum target superheat degree SHsm and the predetermined value SHt. Thus, power consumption of the compressor (21) necessary for obtaining the amount of heat exchange in the evaporators can be appropriately reduced according to the operating state of the refrigeration system, thereby reducing a decrease in the coefficient of performance of the refrigeration system.

In the third aspect, the amount of change determined by the determination part (5a) can be corrected based on the capacity of the evaporator (27) having the minimum target superheat degree SHsm. Thus, according to the capacity of the evaporator (27) having the minimum target superheat degree SHsm, the power consumption of the compressor (21) can be more appropriately reduced to reduce a decrease in the coefficient of performance of the refrigeration system.

In the fourth aspect, even the refrigeration system including the refrigerant circuit (20) in which carbon dioxide is enclosed, power consumption of the compressor (21) necessary for obtaining the amount of heat exchange in the evaporators (27) can be reduced as much as possible to reduce a decrease in the coefficient of performance of the refrigeration system. In addition, if the refrigeration system of this aspect is configured such that the set temperature Tem is gradually changed to larger values from the current value, i.e., is gradually increased from the current value, and when the minimum target superheat degree SHsm reaches the predetermined value SHt or less, the change in the set temperature Tem is stopped, thus enabling control of the target superheat degrees SHs of the evaporators (27). Accordingly, in the case where the degree of a decrease in the COP with an increase in the refrigerant outlet superheat degree SH is higher than that in the case of using a fluorocarbon refrigerant, as in a refrigeration system using carbon dioxide, control for preventing an increase in the refrigerant outlet superheat degree SH can reduce a decrease in the coefficient of performance of the refrigeration system.

Figure 1:
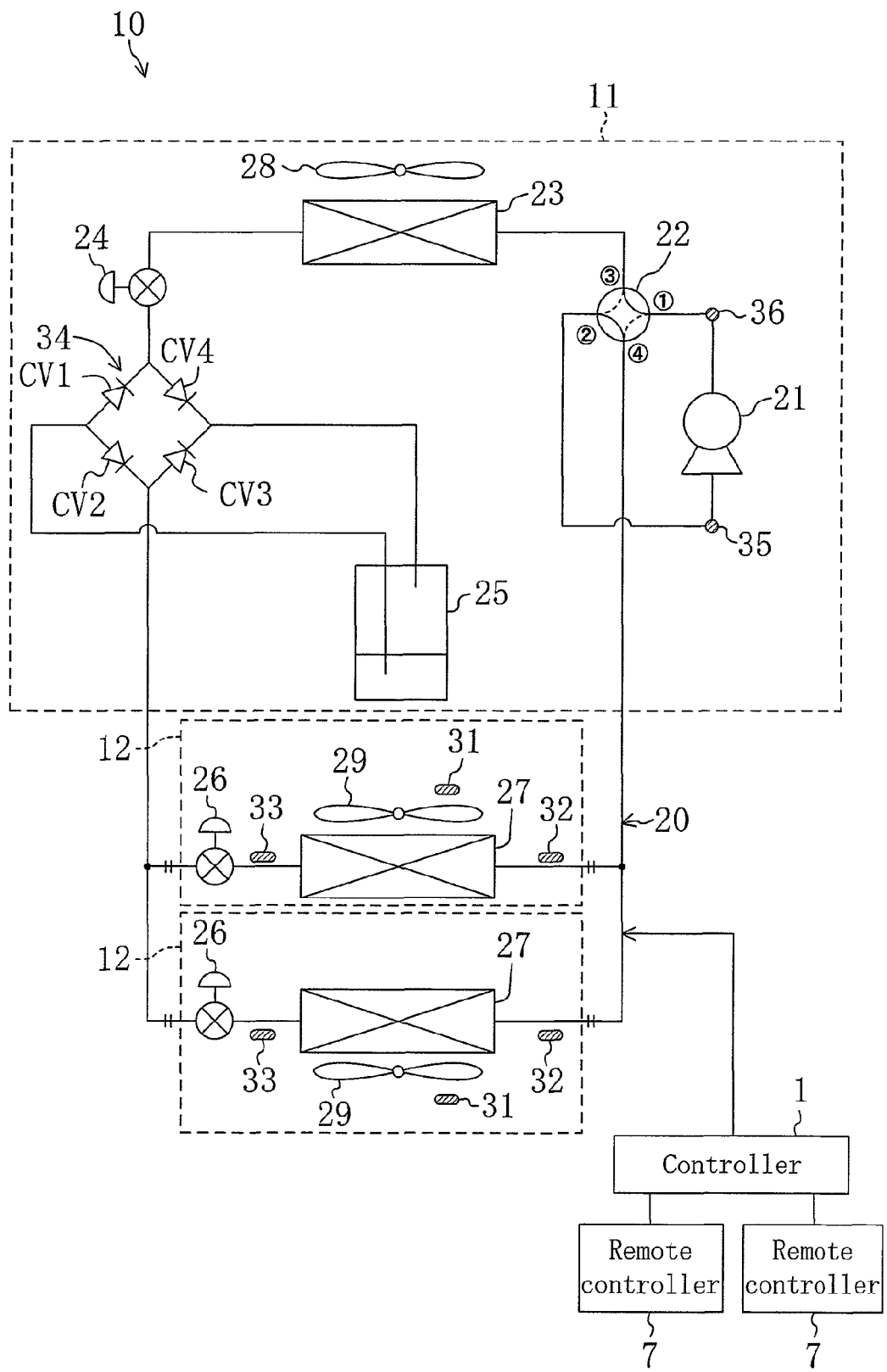
FIG. 1 FIG. 1 is a refrigerant circuit diagram of an air conditioner according to an embodiment of the present invention.

DESCRIPTION OF REFERENCE CHARACTERS 1 controller
2 superheat-degree calculation unit
3 minimum-target-superheat-degree calculation unit
4a evaporation-temperature setting unit
4b superheat-degree setting unit
5 change unit
5a determination part
5b correction part
6 inverter control unit (capacity adjustment unit)
7 remote controller
8 target-superheat-degree setting unit
9 expansion valve control unit (opening degree adjustment unit)
10 air conditioner
11 outdoor unit
12 indoor unit
20 refrigerant circuit
21 compressor
22 four-way selector valve
23 outdoor heat exchanger
24 outdoor expansion valve
receiver
26 indoor expansion valve (expansion valve)
27 indoor heat exchanger (evaporator)
31 indoor-temperature sensor
32 first refrigerant temperature sensor
33 second refrigerant temperature sensor
34 check valve bridge circuit
35 low-pressure pressure sensor
36 high-pressure pressure sensor

DESCRIPTION OF EMBODIMENTS

An embodiment of the present invention will be specifically described hereinafter with reference to the drawings.

FIG. 1 is a refrigerant circuit diagram illustrating an air conditioner according to this embodiment. The air conditioner (a refrigeration system) (10) of this embodiment is a multi-type air conditioner including an outdoor unit (11) and a plurality of indoor units (12), and can perform cooling operation and heating operation. The outdoor unit (11) is placed outdoors, and each of the indoor units (12) is placed in an indoor space. As illustrated in FIG. 1, the air conditioner (10) includes a refrigerant circuit (20), a controller (1), and remote controllers (7) associated with the respective indoor units (12).

<Refrigerant Circuit>

The refrigerant circuit (20) is a closed circuit using carbon dioxide as a refrigerant, and is configured to perform a supercritical refrigeration cycle in which the high pressure of the refrigerant circuit (20) is set at a pressure higher than or equal to a critical pressure of carbon dioxide.

The refrigerant circuit (20) is connected to a compressor (21), a four-way selector valve (22), an outdoor heat exchanger (23), an outdoor expansion valve (24), a receiver (25), a check valve bridge circuit (34), indoor expansion valves (expansion mechanisms) (26), and indoor heat exchangers (evaporators) (27). The compressor (21), the four-way selector valve (22), the outdoor heat exchanger (23), the outdoor expansion valve (24), and the receiver (25) are provided in the outdoor unit (11). The indoor expansion valves (26) and the indoor heat exchangers (27) are provided in the indoor units (12). In the outdoor unit (11), an outdoor fan (28) is provided near the outdoor heat exchanger (23). In each of the indoor units (12), an indoor fan (29) is provided near the indoor heat exchanger (27).

Specifically, in the refrigerant circuit (20), the discharge side of the compressor (21) is connected to a first port of the four-way selector valve (22), and the suction side thereof is connected to a second port of the four-way selector valve (22). In the refrigerant circuit (20), the outdoor heat exchanger (23), the outdoor expansion valve (24), the check valve bridge circuit (34), the receiver (25), the indoor expansion valves (26), and the indoor heat exchangers (27) are located in this order from a third port to a fourth port of the four-way selector valve (22). In the foregoing configuration, two indoor heat exchangers (27) are provided, and are located in parallel to each other. The indoor expansion valves (26) are provided for the respective indoor heat exchangers (27).

The check valve bridge circuit (34) includes first to fourth check valves (CV1, CV2, CV3, CV4) which are connected to one another through refrigerant pipes as illustrated in FIG. 1. The refrigerant pipe extending from the outdoor expansion valve (24) is connected to a portion between the first check valve (CV1) and the fourth check valve (CV4). The refrigerant pipes extending from the respective indoor expansion valves (26) are combined together, and connected to a portion between the second check valve (CV2) and the third check valve (CV3). The refrigerant pipe extending from a refrigerant inlet portion of the receiver (25) is connected to a portion between the third check valve (CV3) and the fourth check valve (CV4). The refrigerant pipe extending from a refrigerant outlet portion of the receiver (25) is connected to a portion between the first check valve (CV1) and the second check valve (CV2).

The first check valve (CV1) is oriented to allow a flow from the refrigerant outlet portion of the receiver (25) to the outdoor heat exchanger (23). The second check valve (CV2) is oriented to allow a flow from the refrigerant outlet portion of the receiver (25) to the indoor expansion valves (26). The third check valve (CV3) is oriented to allow a flow from the indoor expansion valves (26) to the refrigerant inlet portion of the receiver (25). The fourth check valve (CV4) is oriented to allow a flow from the outdoor heat exchanger (23) to the refrigerant inlet portion of the receiver (25).

The compressor (21) is hermetic, and has its capacity variable by an inverter (not shown) electrically connected to the compressor (21). The compressor (21) is configured to compress a sucked refrigerant to a critical pressure or more and then discharge the resultant refrigerant. The outdoor heat exchanger (23) is an air-heat exchanger which performs heat exchange between outdoor air taken by the outdoor fan (28) and a refrigerant. Each of the indoor heat exchangers (27) is an air-heat exchanger which performs heat exchange between indoor air taken by an associated one of the indoor fans (29) and a refrigerant. Each of the outdoor expansion valve (24) and the indoor expansion valves (26) is an electronic expansion valve having a variable opening degree.

The receiver (25) is a vertically oriented cylindrical hermetic container which has a refrigerant inlet and a refrigerant outlet. The container is configured to temporarily store a refrigerant which has flown through the refrigerant inlet and allow the stored refrigerant to flow from the refrigerant outlet.

The four-way selector valve (22) can be switched between a first state (indicated by solid lines in FIG. 1) in which the first port communicates with the third port and the second port communicates with the fourth port and a second state (indicated by broken lines in FIG. 1) in which the first port communicates with the fourth port and the second port communicates with the third port. Specifically, when the four-way selector valve (22) is in the first state in the refrigerant circuit (20), a refrigerant circulates in a cooling cycle, indoor heat exchangers (27) serve as evaporators, and the outdoor heat exchanger (23) serves as a condenser. When the four-way selector valve (22) is in the second state in the refrigerant circuit (20), a refrigerant circulates in a heating cycle, the indoor heat exchangers (27) serve as condensers, and the outdoor heat exchanger (23) serves as an evaporator.

The refrigerant circuit (20) includes indoor-temperature sensors (31), first refrigerant temperature sensors (32), and second refrigerant temperature sensors (33). Each of the indoor-temperature sensors (31) detects a suction temperature Ta of indoor air in an associated one of the indoor heat exchangers (27). Each of the first refrigerant temperature sensors (32) detects a refrigerant outlet temperature Tout of an associated one of the indoor heat exchangers (27) when a refrigerant circulates in the cooling cycle in the refrigerant circuit (20). Each of the second refrigerant temperature sensors (33) detects a refrigerant outlet temperature of an associated one of the indoor heat exchangers (27) when a refrigerant circulates in the heating cycle in the refrigerant circuit (20). The refrigerant circuit (20) includes a high-pressure pressure sensor (36) for detecting a high pressure of the refrigerant circuit (20) and a low-pressure pressure sensor (35) for detecting a low pressure of the refrigerant circuit (20).

<Controller>

The controller (1) controls operation of the air conditioner (10). The controller (1) is connected to sensors provided at various locations of the air conditioner (10) and the remote controllers (7) for issuing operation instructions of the air conditioner (10), through electric wiring. The controller (1) is connected to actuators such as the compressor (21), the inverter, the four-way selector valve (22), the outdoor expansion valve (24), and the indoor expansion valves (26), through electric wiring.

The controller (1) is configured to perform operation control by driving the actuators according to a detection signal input from the sensors and an operation signal input from the remote controllers (7).

Figure 2:
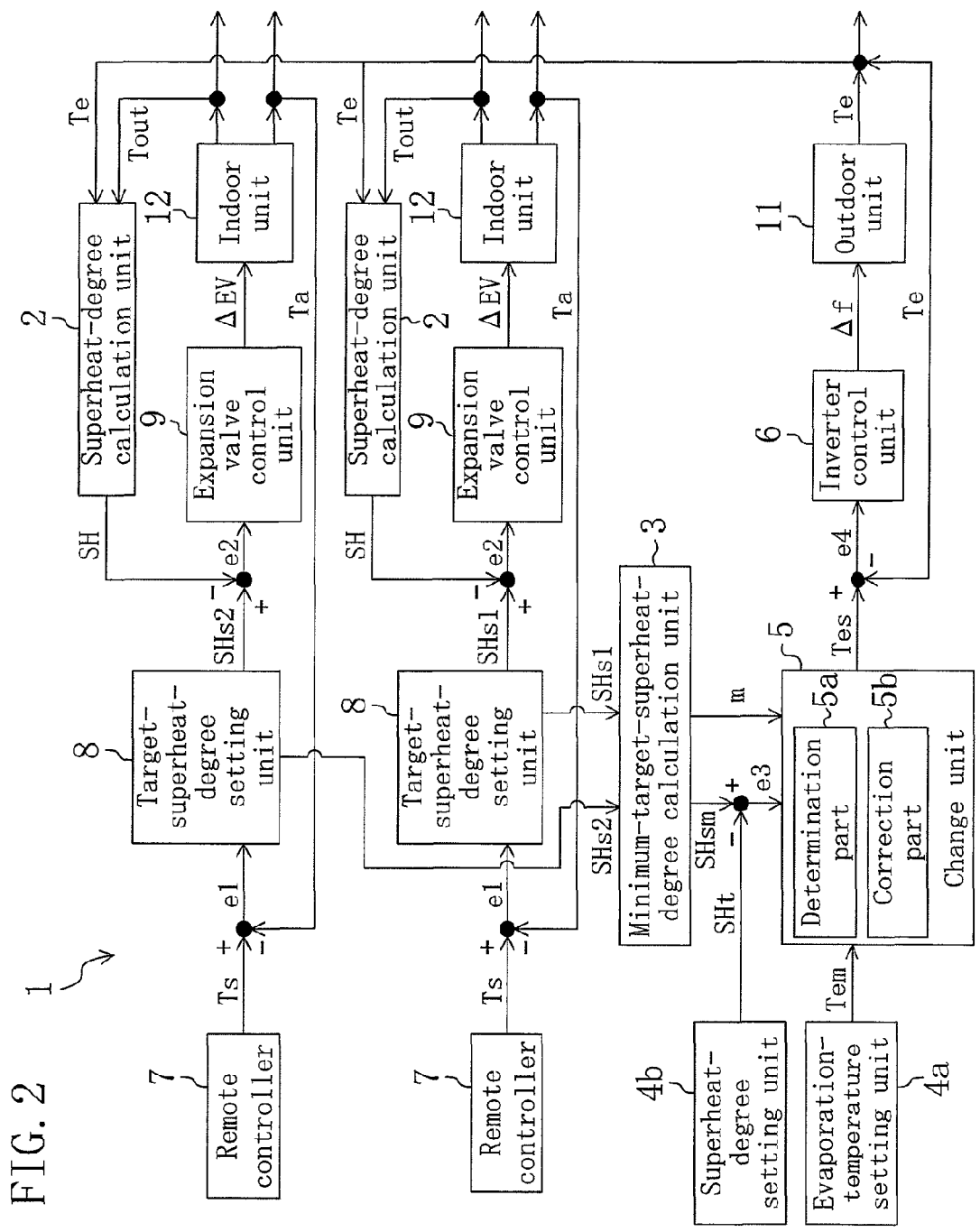
FIG. 2 FIG. 2 is a block diagram illustrating a configuration of a controller.

FIG. 2 is a block diagram illustrating a configuration of the controller (1). As illustrated in FIG. 2, the controller (1) includes superheat-degree calculation units (2), a minimum-target-superheat-degree calculation unit (3), an evaporation-temperature setting unit (4a), a superheat-degree setting unit (4b), a change unit (5), an inverter control unit (a capacity adjustment unit) (6), target-superheat-degree setting units (8), and expansion valve control units (pressure-reduction-amount adjustment units) (9). One of the superheat-degree calculation units (2), one of the target-superheat-degree setting units (8), and one of the expansion valve control units (9) are provided in the controller (1) for each of the indoor units (12).

In the foregoing configuration, conventional refrigerant outlet superheat degree control is performed by the superheat-degree calculation units (2), the target-superheat-degree setting units (8), the expansion valve control units (9), and the indoor expansion valves (26), and conventional compressor capacity control is performed by the evaporation-temperature setting unit (4a), the inverter control unit (6), and the compressor (21). Control of a change in the setting of the evaporation temperature, which is a feature of the present invention, is performed by the minimum-target-superheat-degree calculation unit (3), the superheat-degree setting unit (4b), and the change unit (5). These controls will be specifically described later.

—Operational Behavior—
<Cooling Operation>

Operational behavior of the air conditioner (10) will now be described.

First, in cooling operation, the four-way selector valve (22) is set in the first state. In this state, when the compressor (21) is started, a cooling cycle in which the outdoor heat exchanger (23) serves as a heat dissipater and the indoor heat exchangers (27) serve as evaporators, is performed.

Specifically, a refrigerant compressed to a supercritical region in the compressor (21) is discharged from the compressor (21), and then flows into the outdoor heat exchanger (23) through the four-way selector valve (22). The refrigerant which has flown into the outdoor heat exchanger (23) dissipates heat to outdoor air, and flows out of the outdoor heat exchanger (23) into the outdoor expansion valve (24). The pressure of the refrigerant which has flown into the outdoor expansion valve (24) is reduced from the supercritical region to a dual-phase region, and then the resultant refrigerant flows out of the outdoor expansion valve (24). The dual-phase refrigerant passes through the check valve bridge circuit (34), and then flows into the receiver (25). The receiver (25) temporarily stores the dual-phase refrigerant, and the stored liquid refrigerant flows out of the receiver (25).

The refrigerant which has flown out of the receiver (25) passes through the check valve bridge circuit (34), and then branches off to flow into the indoor expansion valves (26). The pressure of the refrigerant which has flown into each of the indoor expansion valves (26) is reduced to a predetermined value, and the resultant refrigerant flows out of the indoor expansion valve (26) into an associated one of the indoor heat exchangers (27). The refrigerant which has flown into the indoor heat exchangers (27) absorbs heat from indoor air to evaporate, and then flows out of the indoor heat exchangers (27). At this time, the indoor air releases heat to be cooled, and the cooled indoor air is supplied to rooms. The refrigerants from the indoor heat exchangers (27) are combined together, and the combined refrigerant passes through the four-way selector valve (22) to be sucked into the compressor (21). In the compressor (21), the refrigerant is compressed to the supercritical region again, and is discharged from the compressor (21). In this manner, the refrigerant circulates, thereby performing cooling operation of the air conditioner.

<Heating Operation>

In heating operation, the four-way selector valve (22) is set in the second state. In this state, when the compressor (21) is started, a heating cycle in which the outdoor heat exchanger (23) serves as an evaporator and the indoor heat exchangers (27) serve as heat dissipaters, is performed.

Specifically, a refrigerant compressed to a supercritical region in the compressor (21) is discharged from the compressor (21). The refrigerant discharged from the compressor (21) passes through the four-way selector valve (22), and then branches off to flow into the indoor heat exchangers (27). The refrigerant which has flown into the indoor heat exchangers (27) dissipates heat to indoor air, and then flows out of the indoor heat exchangers (27). At this time, indoor air is heated by the heat dissipation, and the heated indoor air is supplied to rooms. The refrigerant which has flown out of the indoor heat exchangers (27) flows into the indoor expansion valves (26). The pressure of the refrigerant which has flown into each of the indoor expansion valves (26) is reduced from the supercritical region to a predetermined pressure, and the resultant refrigerant flows out of the indoor expansion valves (26). The refrigerants from the indoor expansion valves (26) are combined together, and then flows into the receiver (25) through the check valve bridge circuit (34). The receiver (25) temporarily stores a dual-phase refrigerant, and the stored liquid refrigerant flows out of the receiver (25).

The refrigerant from the receiver (25) passes through the check valve bridge circuit (34), and then flows into the outdoor expansion valve (24). The pressure of the refrigerant which has flown into the outdoor expansion valve (24) is reduced to a predetermined pressure, and the resultant refrigerant flows out of the outdoor expansion valve (24) into the outdoor heat exchanger (23). The refrigerant which has flown into the outdoor heat exchanger (23) absorbs heat from outdoor air to evaporate, and then flows out of the outdoor heat exchanger (23). The refrigerant from the outdoor heat exchanger (23) passes through the four-way selector valve (22), and is sucked into the compressor (21). In the compressor (21), the refrigerant is compressed to the supercritical region again, and then is discharged from the compressor (21). In this manner, the refrigerant circulates, thereby performing heating operation of the air conditioner.

<Operation Control by Controller>

Operation control performed in cooling operation will now be described with reference to FIG. 2. First, the refrigerant outlet superheat degree control and the compressor capacity control will be described. Then, control of a change in the setting of the evaporation temperature will be described.

In the refrigerant outlet superheat degree control, a deviation e1 is calculated based on an indoor set temperature Ts output from each of the remote controllers (7) and a suction temperature Ta fed back from each of the indoor-temperature sensors (31). Specifically, the deviation e1 is obtained by subtracting the suction temperature Ta from the indoor set temperature Ts. This deviation e1 is input to each of the target-superheat-degree setting units (8).

Each of the target-superheat-degree setting units (8) converts the input deviation e1 into a target superheat degree SHs, and outputs the target superheat degree SHs. Each of the target-superheat-degree setting units (8) has a function with which the deviation e1 and the target superheat degree SHs have a predetermined relationship. Based on this function, the deviation e1 is converted into the target superheat degree SHs.

Specifically, when the suction temperature Ta is higher than the indoor set temperature Ts, the target superheat degree SHs is changed to a degree lower than the current degree. On the other hand, when the suction temperature Ta is lower than the indoor set temperature Ts, the target superheat degree SHs is changed to a degree higher than the current degree.

Then, a deviation e2 is calculated based on the target superheat degree SHs output from each of the target-superheat-degree setting units (8) and the refrigerant outlet superheat degree SH fed back from each of the indoor units (12) through an associated one of the superheat-degree calculation units (2). Specifically, the deviation e2 is obtained by subtracting a current refrigerant outlet superheat degree SH from the target superheat degree SHs. The deviation e2 is input to each of the expansion valve control units (9).

Each of the expansion valve control units (9) converts the input deviation e2 into an expansion valve opening degree amount ΔEV, and outputs the expansion valve opening degree amount ΔEV. Each of the expansion valve control units (9) has a function with which the deviation e2 and the expansion valve opening degree amount ΔEV have a predetermined relationship. Based on this function, the deviation e2 is converted into the expansion valve opening degree amount ΔEV.

Specifically, when the current refrigerant outlet superheat degree SH is higher than the target superheat degree SHs, the opening degree of each of the indoor expansion valves (26) is changed to a degree higher than the current degree. On the other hand, when the current refrigerant outlet superheat degree SH is lower than the target superheat degree SHs, the opening degree of each of the indoor expansion valves (26) is changed to a degree lower than the current degree. Then, a suction temperature Ta and a refrigerant outlet temperature Tout changed according to the change in the opening degree of each of the indoor expansion valves (26) are fed back.

In this manner, the opening degree of each of the indoor expansion valves (26) is adjusted to adjust the flow rate of a refrigerant flowing in an associated one of the indoor heat exchangers (27), thereby changing the amount of heat exchange in the indoor heat exchanger (27) so that the suction temperature Ta approaches the indoor set temperature Tem of a room.

Then, the capacity control of the compressor is described.

The evaporation-temperature setting unit (4a) sets an evaporation temperature Te of a refrigerant circulating in the refrigerant circuit (20), and is configured to output a set temperature Tem of the evaporation temperature when receiving the length of connection pipes connecting the outdoor unit (11) to the indoor units (12), the outdoor-air temperature of an outdoor space in which the outdoor unit (11) is placed, and the indoor set temperatures Ts from the remote controllers (7), for example. The set temperature Tem output from this evaporation-temperature setting unit (4a) is converted into a setting change temperature Tes in the change unit (5), which will be described later, when necessary.

Based on the setting change temperature Tes output from the change unit (5) and an evaporation temperature Te fed back from the outdoor unit (11), a deviation e4 is calculated. Specifically, the deviation e4 is obtained by subtracting the current evaporation temperature Te from the setting change temperature Tes. The deviation e4 is input to the inverter control unit (6).

The inverter control unit (6) converts the input deviation e4 into a frequency change amount Δf, and outputs the frequency change amount Δf. The inverter control unit (6) has a function with which the deviation e4 and the frequency change amount Δf have a predetermined relationship. Based on this function, the deviation e4 is converted into the frequency change amount Δf.

Specifically, when the current evaporation temperature Te is higher than the setting change temperature Tes, the frequency of the compressor (21) is changed to a value larger than the current value. On the other hand, when the current evaporation temperature Te is lower than the setting change temperature Tes, the frequency of the compressor (21) is changed to a value smaller than the current value. Then, the evaporation temperature Te changed according to the change in the frequency of the compressor (21) is fed back.

In this manner, the operating frequency of the compressor (21) is adjusted such that the evaporation temperature Te approaches the setting change temperature Tes.

Then, control of the change in the setting of the evaporation temperature is described.

When the air conditioner (10) starts operating, the superheat-degree setting unit (4b) outputs a predetermined value SHt which is a threshold value for determining whether a change in the set temperature Tem is permitted or not.

On the other hand, the target superheat degrees SHs output from the target-superheat-degree setting units (8) are input to the minimum-target-superheat-degree calculation unit (3). When receiving the target superheat degrees SHs, the minimum-target-superheat-degree calculation unit (3) outputs the lowest one (i.e., the minimum target superheat degree SHsm) of the input target superheat degrees SHs and a capacity value m which indicates the capacity of the indoor heat exchanger (27) having the minimum target superheat degree SHsm in the indoor units (12).

Based on the minimum target superheat degree SHsm output from the minimum-target-superheat-degree calculation unit (3) and the predetermined value SHt output from the superheat-degree setting unit (4b), a deviation e3 is calculated. Specifically, the deviation e3 is obtained by subtracting the predetermined value SHt from the minimum target superheat degree SHsm. The deviation e3 is input to the change unit (5) together with the capacity value m.

As described above, the change unit (5) converts the set temperature Tem output from the evaporation-temperature setting unit (4a) into the setting change temperature Tes when necessary, and outputs the setting change temperature Tes. The change unit (5) includes a determination part (5a) and a correction part (5b). The determination part (5a) converts the set temperature Tem into a setting change temperature Tes' before correction. The correction part (5b) corrects this setting change temperature Tes' before correction when necessary.

The determination part (5a) has a function with which the input deviation e3 and the setting change temperature Tes' before correction have a predetermined relationship. Based on this function, the deviation e3 is converted into the setting change temperature Tes' before correction.

Specifically, when the deviation e3 is zero or less, i.e., the minimum target superheat degree SHsm is lower than or equal to the predetermined value SHt, the input set temperature Tem is not converted. Then, the change unit (5) outputs a value equal to the input set temperature Tem, as the setting change temperature Tes.

On the other hand, when the deviation e3 is larger than zero, i.e., the minimum target superheat degree SHsm is higher than the predetermined value SHt, the setting change temperature Tes' before correction is converted into a value larger than the current set temperature Tem.

The correction part (5b) has a function with which the capacity value m of the indoor heat exchanger (27) and the correction factor have a predetermined relationship. This function has a predetermined capacity value with which the correction factor is 1 (one). As the input capacity value m increases from this predetermined capacity value, the correction factor increases from 1 (one). As the input capacity value m decreases from the predetermined capacity value, the correction factor decreases from 1 (one).

This correction factor is added to the setting change temperature Tes' before correction determined by the determination part (5a), thereby obtaining a setting change temperature Tes. That is, when the capacity of the indoor heat exchanger (27) having the minimum target superheat degree SHsm is large, the setting change temperature Tes' before correction is corrected to a larger value. When the capacity of the indoor heat exchanger (27) having the minimum target superheat degree SHsm is small, the setting change temperature Tes' before correction is corrected to a smaller value. Then, the change unit (5) outputs the corrected value as the setting change temperature Tes.

—Advantages of Embodiments—

Unlike conventional air conditioners, in the air conditioner of this embodiment, the set temperature Tem can be changed to the setting change temperature Tes higher than the current value, based on the target superheat degrees SHs of the indoor heat exchangers (27). Then, the evaporation temperature Te approaches the setting change temperature Tes, thereby reducing power consumption of the compressor (21) as compared to the change in the set temperature Tem, while preventing the amount of heat exchange in the indoor heat exchangers (27) from decreasing from the amount before the change in the set temperature Tem. Accordingly, in the air conditioner with the refrigerant circuit (20) including the indoor heat exchangers (27), power consumption of the compressor (21) necessary for obtaining the amount of heat exchange in the indoor heat exchangers (27) can be reduced as much as possible, to reduce a decrease in the coefficient of performance (COP) of the air conditioner.

Figure 3:
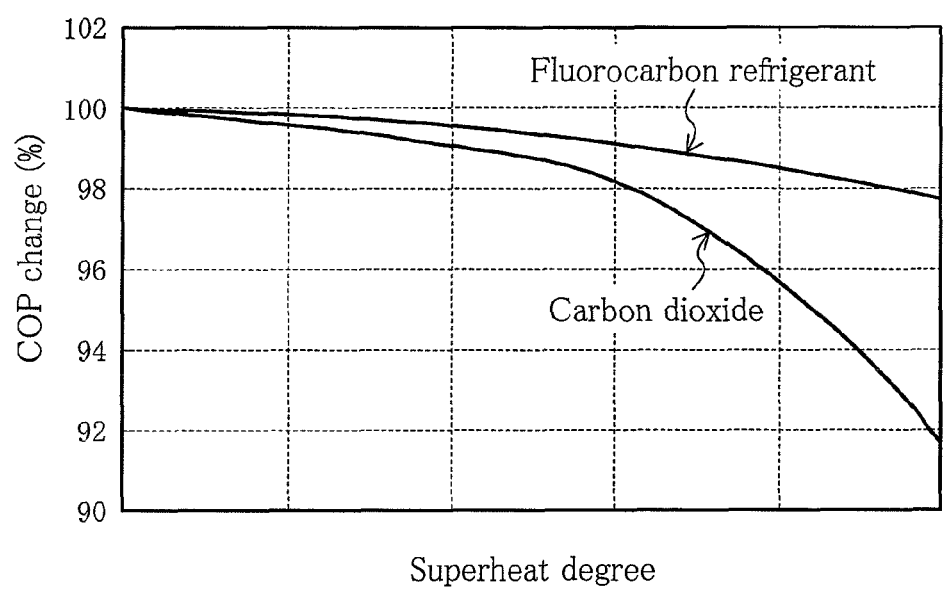
FIG. 3 is a graph showing a relationship between a superheat degree and a COP.

The change in the set temperature Tem to the setting change temperature Tes increases the evaporation temperature Te of each of the indoor heat exchangers (27) and reduces the refrigerant outlet superheat degree SH of each of the evaporators (27). As shown in FIG. 3, the COP tends to increase as the refrigerant outlet superheat degree SH decreases. Thus, a decrease in the lower refrigerant outlet superheat degree SH of each of the indoor heat exchangers (27) can reduce power consumption of the compressor (21) as much as possible to reduce a decrease in the coefficient of performance (COP) of the air conditioner.

In this embodiment, the amount of change in the set temperature Tem to the setting change temperature Tes is set based on a deviation between the minimum target superheat degree SHsm and the predetermined value SHt. Thus, according to the operating sate of the air conditioner, power consumption of the compressor (21) necessary for obtaining the amount of heat exchange in the evaporators can be appropriately reduced to reduce a decrease in the coefficient of performance of the air conditioner.

In addition, in this embodiment, the amount of change determined by the determination part (5a) can be corrected based on the capacity of the evaporator (27) having the minimum target superheat degree SHsm. Thus, according to the capacity of the evaporator (27) having the minimum target superheat degree SHsm, the power consumption of the compressor (21) can be more appropriately reduced to reduce a decrease in the coefficient of performance of the air conditioner.

<<Other Embodiments>>

The foregoing embodiment may have the following configurations.

In the embodiment, the indoor expansion valves (26) are used as expansion mechanisms. However, the present invention is not limited to this configuration. Alternatively, expanders may be used as the expansion mechanisms, for example.

In the embodiment, each of the target-superheat-degree setting units (8), the expansion valve control units (9), the inverter control unit (6), and the determination part (5a) converts an input deviation into an output value based on a predetermined function. However, the present invention is not limited to this configuration. The input deviation may be converted into an output value based on feedback control or a combination of feedback control and feed-forward control, instead of the function.

In the embodiment, the controller (1) performs the refrigerant outlet superheat degree control, the compressor capacity control, and the control of change in the setting of the evaporation temperature with a feedback technique. However, the present invention is not limited to this configuration. Alternatively, these controls may be performed by a model-based technique or a non-interactive technique.

In the embodiment, the controller (1) is configured such that when the minimum target superheat degree SHsm is higher than the predetermined value SHt, the change unit (5) changes the set temperature Tem to the setting change temperature Tes higher than the current value. However, the present invention is not limited to this configuration. Alternatively, for example, the controller (1) may be configured such that the set temperature Tem is gradually changed to higher values from the current value, i.e., is gradually increased from the current value, and when the minimum target superheat degree SHsm reaches the predetermined value SHt or less, the change in the set temperature Tem is stopped.

In this embodiment, the functions used by the target-superheat-degree setting units (8), the expansion valve control units (9), the inverter control unit (6), the determination part (5a), and the correction part (5b) may be mathematical expressions, or maps created based on the mathematical expressions. Unlike the mathematical expressions, the use of the maps can avoid complicated calculation.

In the embodiment, the air conditioner can be switched between cooling operation and heating operation. However, the present invention is not limited to this configuration. Alternatively, the air conditioner may be a refrigeration system dedicated to cooling operation. In the embodiment, carbon dioxide is enclosed in the refrigerant circuit (20). However, the present invention is not limited to this configuration. Alternatively, for example, a fluorocarbon refrigerant may be enclosed in the refrigerant circuit (20).

The foregoing embodiments are merely preferred examples in nature, and are not intended to limit the scope, applications, and use of the invention.

Industrial Applicability

As described above, the present invention is useful for techniques for controlling operations of refrigeration systems including a refrigerant circuit in which a plurality of evaporators are connected.

The invention claimed is:

1. A refrigeration system, comprising:
    a refrigerant circuit (20) configured to perform a refrigeration cycle and including a compressor (21) having a variable capacity, a plurality of evaporators (27), and expansion mechanisms (26) respectively associated with the evaporators (27);
    a capacity adjustment unit (6) configured to adjust the capacity of the compressor (21) such that an evaporation temperature Te of a refrigerant circulating in the refrigerant circuit (20) approaches a predetermined set temperature Tem;
    a pressure-reduction-amount adjustment unit (9) configured to adjust an amount of pressure reduction of a refrigerant passing through each of the expansion mechanisms (26) such that a refrigerant outlet superheat degree SH of an associated one of the evaporators (27) approaches a target superheat degree SHs determined based on an amount of heat exchange necessary for the evaporator (27); and
    a change unit (5) configured to change the set temperature Tem to a value larger than a current value when a lowest one of target superheat degrees SHs determined for the respective evaporators (27) is higher than a predetermined value SHt.

2. The refrigeration system of claim 1, wherein the change unit (5) includes a determination part (5a) configured to determine an amount of change in the set temperature Tem based on a deviation between the lowest one of the target superheat degrees SHs determined for the respective evaporators (27) and the predetermined value SHt, and
    the change unit (5) is configured to change the set temperature Tem to a value larger than a current value by the amount of change determined by the determination part (5a).

3. The refrigeration system of claim 2, wherein the change unit (5) includes a correction part (5b) configured to correct the amount of change determined by the determination part (5a) to a larger value when one of the evaporators (27) having a relatively large capacity has the lowest target superheat degree SHs, and to a smaller value when one of the evaporators (27) having a relatively small capacity has the lowest target superheat degree SHs.

4. The refrigeration system of one of claims 1-3, wherein the refrigerant circulating in the refrigerant circuit (20) is carbon dioxide.

* * * * *